Figure 5:
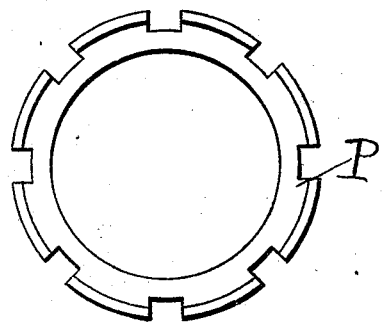

No. 695,685.  
Patented Mar. 18, 1902.
C. HANROTT & H. O. SEYD.
COASTER BRAKE.
(Application filed June 12, 1901.)
(No Model.)  
2 Sheets—Sheet 1.
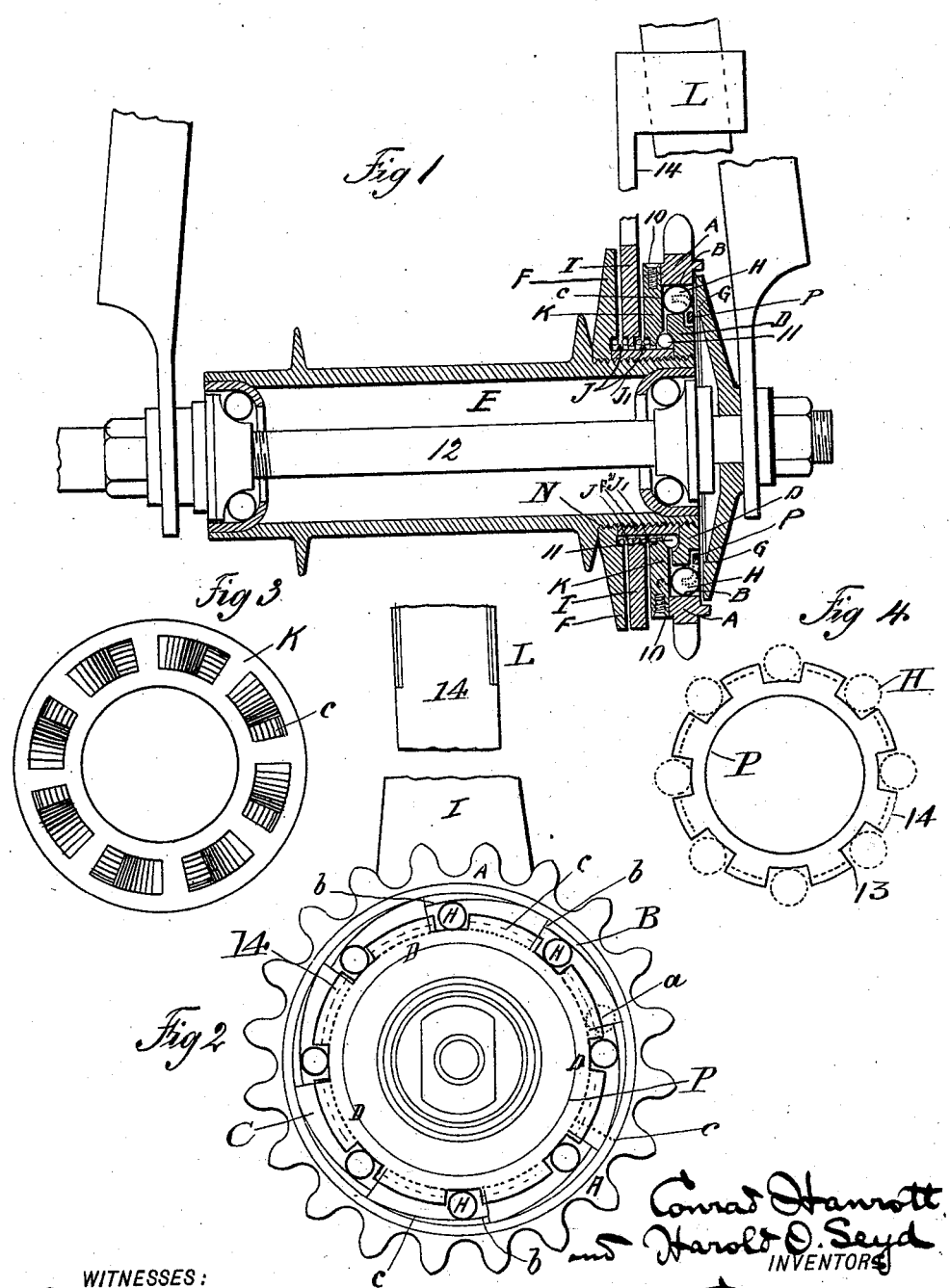
WITNESSES:
Conrad Hanrott  
Harold O. Seyd  
INVENTORS
BY Edgar Tate  
ATTORNEYS No. 695,685. Patented Mar. 18, 1902.
C. HANROTT & H. O. SEYD.
COASTER BRAKE.
(Application filed June 12, 1901.)
(No Model.) 2 Sheets—Sheet 2.

WITNESSES
F A Stewart
F F Seller

INVENTORS
Conrad Hanrott
and Harold Otto Seyd

BY
Edgar Tate
ATTORNEYS

UNITED STATES PATENT OFFICE.

CONRAD HANROTT AND HAROLD OTTO SEYD, OF LONDON, ENGLAND.

COASTER-BRAKE.

SPECIFICATION forming part of Letters Patent No. 695,685, dated March 18, 1902.

Application filed June 12, 1901. Serial No. 64,297. (No model.)

*To all whom it may concern:*

Be it known that we, CONRAD HANROTT and HAROLD OTTO SEYD, subjects of the King of Great Britain, residing at London, England, have invented certain new and useful Improvements in Driving, Coasting, and Braking Mechanism for Bicycles, of which the following is a full and complete specification, such as will enable those skilled in the art to which it appertains to make and use the same.

The object of this invention is to provide an improved driving, coasting, and braking mechanism for bicycles and similar vehicles by which the same may be automatically braked by the bearing pressure exerted upon the pedals.

To such ends our invention consists, in substance, of a driven member consisting of a ring, an annular outer friction-face rigidly mounted upon the wheel-hub of the driving-wheel of a vehicle, an annular ring, constituting the driving member, usually provided with exterior sprockets, surrounding the driven member and provided upon its interior annular face with backward and inwardly projecting locking cams or lugs, a locking or brake-actuating ring secured to the driving member and covering the spaces between the driving and driven members, provided with inwardly and forwardly projecting locking cams or lugs, a friction-disk rigidly mounted upon the hub, an engaging disk rigidly mounted upon the axle, a brake or friction disk secured to the hub and an engaging disk mounted upon the axle, a ball-caging ring having projecting peripheral portions extending at right angles thereto, revolubly carried by the driven member, and a plurality of balls in the spaces of the engaging ring, interposed between the driving and driven members.

Although it is not to be understood that the invention is limited to a device necessarily comprising at once all of the devices or mechanisms before mentioned, our invention consists in certain various combinations or arrangements of the devices and parts and the construction of certain devices and parts, all of which are substantially and fully described in the specification and pointed out in the drawings.

Figure 6:
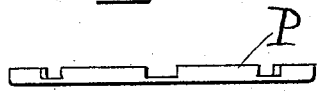

Figure 1 is a view in central longitudinal section of a vehicle-hub provided with our improved driving, coasting, and braking mechanism. Fig. 2 is an end view of such mechanism looking from the left, the engaging disk being removed and the fork of the frame broken away. Fig. 3 is a face view of the face cam-ring of the driving member. Fig. 4 is a like view of the ball-cage ring, the balls being shown in position in dotted lines; Fig. 5, an inside view of a ball-cage ring which we employ, and Fig. 6 a side view thereof.

In the drawings, A designates the driving member or sprocket, which consists of an annular ring provided on the exterior with sprockets of the usual form, as shown, and on the interior with a plurality of inwardly-extending locking cams or lugs B.

E designates the bicycle-hub, provided on the exterior with a screw-thread N, upon which is screwed the inner friction-disk F, of any suitable material, and next to the friction-disk F a sleeve $F^2$ is screwed onto said hub, and at the end of said hub and next to said sleeve is screwed a ring D, forming the driving member. Extending down behind the ring or driven member D is the back plate K, secured to the driving member or sprocket A by screws 10, and between this and the ring D is a suitable annular rollway filled with steel balls 11, forming an antifriction-bearing between A and D.

I designates the stationary brake-ring, kept normally out of contact with both the ring K and the friction-disk F by suitable spiral springs J and J', located on either side in a suitable recess formed to receive them, which stationary brake-ring is provided with an upwardly-extending shank 14, ending in a ring or clamp L, by which the same is held against rotation by being secured to the side of the vehicle-frame, as shown in Fig. 1. This stationary brake-ring, however, is not absolutely essential for the working of the device, as in some cases it may be omitted and the ring K brought into direct contact with the friction-face of the friction-disk F, although it is preferable to use such disk I, as then a double braking-surface is provided, and in addition the securing of the disk I to the frame gives a more solid braking action. Firmly screwed upon the axle 12, between the members A and B and the fork, is the stationary engaging disk G, which holds in place in the annular chamfer to receive the lugs the ball-caging washer or ring P, having ball-spaces 13 for holding the balls H, the periphery of the ring between the spaces 13 being turned inward, as shown in dotted lines in Fig. 1 and at 14 in Fig. 4, so as to keep such ball at all times an equal distance apart, there being one of these balls H for each of the locking cams or lugs B, such balls H being of such diameter that when in the position shown in Fig. 2 the same will be locked upon the rear end *b* of the lugs B and the periphery of the lugs B; but when in the position shown in dotted lines at *a* there will be no locking, such balls lying then loosely between the driven and driving members, whereby although the driven member A continues to rotate the driven member D will remain stationary.

Formed upon the face of the back plate K are a plurality of cam-faces or locking-lugs C, as shown in Fig. 3, of like number and similar in form to the cams or locking-lugs B of the driving member A, differing only in that they are formed upon the side instead of the periphery of such ring, which cam-faces or lugs face in the opposite direction to the cams or lugs B, the bases of such cams or locking-lugs C being coincident with the apex or point of each of the lugs B, as shown in dotted lines at *c* in Fig. 2.

It will be seen that when the driving member or sprocket-ring A is rotated in the forward direction or to the right in the direction of the arrow shown in Fig. 2 that the steel balls will be locked upon the inwardly-extending ends of the lugs B and the outer peripheral locking surface of the ring D and that as the sprocket continues to rotate it will cause the rotation of the ring D, and consequently of the wheel-hub E. It will also be seen that if by pressure upon the actuating-pedals or otherwise the driving member or sprocket A be brought to a sudden stop in this rotation that the continued rotation of the hub E and ring D will throw the balls H forward into the wider portion of the spaces between the points of the lugs or cams B, whereby the ring or driven member D will be released from its locking action and such driven member D and hub E will continue to revolve of their own momentum. If, however, the driving member or sprocket A at any time during the forward rotation of the hub E and ring D should have its rotation reversed by being rotated to the rear by back-pedaling, such movement would by the pressure exerted on the balls H by the rear square face of the locking cams or lugs B carry such balls to the left, so as to cause the same to be wedged or locked between the face cams or lugs *c* on the inner side of the ring K and the face of the stationary friction-disk G, which is rigidly mounted upon the stationary axle 12, whereby the sprocket-ring A and the ring K will be forced laterally inward to the left, so as to force the friction-ring I against the friction-disk F, and as such friction-ring I will thus be clamped tightly between the ring K and the disk F the wheel will instantly be braked according to the pressure exerted upon the pedal and the vehicle be brought to a more or less sudden stop. By means of this construction a bicycle or similar vehicle may be propelled in the usual manner and the friction-brake may be applied when desired by reversing the movement of the pedals, and whenever it is desired to coast all that is necessary is to hold the pedals stationary.

Having thus fully described our invention, what we claim as new, and desire to secure by Letters Patent, is—

1. In a driving, coasting and brake mechanism for bicycles and similar vehicles, the combination of a driven member secured to a rotating wheel-hub, a driving ring or member surrounding the driven member and the inner face of which is provided with lugs or cams adapted to lock the driven and driving members together when the driven member is rotated in one direction, a cam disk or ring secured to the driving member and provided on its outer face with locking lugs or cams which extend in a direction opposite to that of the locking lugs or cams of the driving member, a friction-disk mounted on the wheel-hub inwardly of the cam ring or disk, an engaging disk connected with the shaft or axle outside of the driving and driven members, and a plurality of balls placed between the driving and driven members and operating in connection with said lugs or cams of the driving member so as to lock the same to the driven member when the driving member is rotated in one direction and to coact with the locking lugs or cams upon the cam ring or disk, so as to force said cam ring or disk and driving member away from the engaging disk when the driving member is rotated in a reverse direction, substantially as shown and described.

2. In a driving, coasting and brake mechanism for bicycles and similar vehicles, the combination of a driven member secured to a rotating wheel-hub, a driving ring or member surrounding the driven member and the inner face of which is provided with lugs or cams adapted to lock the driven and driving members together when the driven member is rotated in one direction, a cam or ring secured to the driving member and provided on its outer face with locking lugs or cams which extend in a direction opposite to that of the locking lugs or cams of the driving member, a friction-disk mounted on the wheel-hub inwardly of the cam ring or disk, an engaging disk connected with the shaft of axle outside of the driving and driven members, a plurality of balls placed between the driving and driven members and operating in connection with said lugs or cams of the driving member so as to lock the same to the driven member when the driven member is rotated in one direction and to coact with the locking lugs or cams upon the cam ring or disk, so as to force said cam ring or disk and driving member away from the engaging disk when the driving member is rotated in a reverse direction, and a cage-ring for holding said balls in proper relative position, said cage-ring being held in position by the engaging disk, substantially as shown and described.

In testimony that we claim the foregoing as our invention we have signed our names, in presence of the subscribing witnesses, this 7th day of May, 1901.

CONRAD HANROTT.
HAROLD OTTO SEYD.

Witnesses:
H. D. JAMESON,
A. NUTTING.